United States Patent [19]

Sparvieri et al.

[11] Patent Number: 5,073,359
[45] Date of Patent: Dec. 17, 1991

[54] PROCESS FOR MANUFACTURING CERAMIC MAGNETIC MATERIAL

[75] Inventors: Nicola Sparvieri; Paolo Cattarin, both of Rome, Italy

[73] Assignee: Selenia Industrie Elettroniche Associate S.p.A., Rome, Italy

[21] Appl. No.: 487,755

[22] Filed: Mar. 1, 1990

[30] Foreign Application Priority Data

Mar. 1, 1989 [IT] Italy .................. 47699 A/89

[51] Int. Cl.$^5$ .............................................. C01G 49/00
[52] U.S. Cl. ..................................... 423/594; 423/595
[58] Field of Search ................ 423/594, 616, 595, 596

[56] References Cited

U.S. PATENT DOCUMENTS 4,097,392 6/1978 Goldman ........................ 252/62.62
4,486,401 12/1984 Arons et al ........................ 423/594
4,680,130 7/1987 Hibst ................................ 252/62.60

Primary Examiner—William R. Dixon, Jr.
Assistant Examiner—Chris Gallo
Attorney, Agent, or Firm—Cohen, Pontani & Lieberman

[57] ABSTRACT

A process for the manufacture of ceramic materials by production of the citrates and pyrolysis thereof. Specifically, the process yields ultra-fine powders by preparing solutions of respective oxides and/or carbonates in nitric acid, either separately or together; adding citric acid to the solution to obtain metal-organic precipitates and neutralizing the solution with ammonium hydroxide. The neutralized solution is then heated to a temperature so that self-ignition occurs resulting in the production of the ceramic magnetic material as a homogeneous ultra-fine powder.

5 Claims, No Drawings

PROCESS FOR MANUFACTURING CERAMIC MAGNETIC MATERIAL

FIELD OF THE INVENTION

The present invention relates to a process for the production of ceramic materials in ultra-fine powder form by synthesis of the respective citrates and pyrolysis thereof in the correct stoichiometric relation for use in, for example, microwave applications.

BACKGROUND OF THE INVENTION

Microwave ceramic materials, frequently referred to as ferrites, are widely used in, for example, radar systems. The known methods of producing ferrites based upon ceramic technology is to perform a given number of solid state reactions with suitable oxides and/or carbonates by heating them at a high temperature and thereafter wet or dry grinding the product. Although such prior art methods give satisfactory results, the manufacturing times to achieve a mono-phase powder with high purity are inordinately long. Moreover, the typical particle diameter obtainable from oxides and/or carbonates is about 1 $\mu$m.

DESCRIPTION OF THE INVENTION

It is an object of the present invention to prepare ferrite powders for microwave applications and, more precisely for applications related to circuits employed in electronic equipment.

The process greatly facilitates prior art preparation methods and results in substantial reduction of production times. In addition, the electromagnetic characteristics of the resulting material surpass those of the material obtained by traditional techniques. Although the production times are considerably reduced, the magnetic and microwave characteristics are maintained.

Accordingly, the present invention provides a method for the manufacture of ultra-fine powders with correct stoichiometric values resulting in better homogeneity and purity and improved forming characteristics during the pressing phase.

In the process of the present invention solutions of suitable oxides and/or carbonates in nitric acids are prepared, either individually or together. Preferably, 65% nitric acid is used. After obtaining the solution of the oxides and/or carbonates, citric acid is added to further dissolve the mixture and produce the respective citrates.

The oxides used as starting materials, in the amount corresponding to the correct stoichiometric balance of the final product, are dissolved following the dry mixing of the oxides by adding nitric acid having a strength of 65%.

The dry carbonates may be separately mixed or in conjunction with the oxides, dissolved by adding nitric acid and then the solutions of the oxides and the carbonates are mixed together and citric acid is added to the solution containing oxides and carbonates as described above.

After metal organic compounds and metal precipitates are obtained, ammonium hydroxide having a strength of 25% is added resulting in a disappearance of the reactants and in the solution turning into a deep red color at a pH value of between about 6.5 and about 7.0.

It is important to maintain the pH value within the above-described range. If the pH value exceeds about 7.0, hydroxides and other undesirable salts are generated. The solution of the oxides and carbonates after addition of the citric acid and ammonium hydroxide in the manner described, is heated to a temperature of about 200° C. until the reaction mixture turns into a viscous mass which gradually swells due to the presence of the citric acid and then self-ignites to yield ammonium nitrate ($NH_4 NO_3$).

The self-combustion resulting from the described heating of the reaction mixture yields in ferrite powders which increase in volume as the reaction proceeds. Particle dimensions obtained in this reaction are between about 50 and about 100 nm. During the combustion it is essential that there are no precipitates of any of the citrate compounds, otherwise the desired powder would not be obtained.

The salient feature of the present invention is the production of citrates and the pyrolysis thereof to obtain the ceramic magnetic materials for special applications such as, for example, high frequency electronics in which high material purity and homogeneity are required.

It should be understood that the preferred embodiment and example described above are for illustrative purposes only and are not to be construed as limiting the scope of the invention which is properly delineated only in the appended claims.

What is claimed is:

1. A method of producing ceramic magnetic material comprising:
    dissolving metal oxides and metal carbonates in nitric acid;
    adding citric acid thereto to yield metal organic precipitates;
    neutralizing the remaining solution by the addition of ammonium hydroxide to result in a substantially neutral solution; and
    heating the neutralized solution to a temperature of about 200° C. to cause self-combustion and to yield the ceramic magnetic material.

2. The method of claim 1, wherein the nitric acid has a strength of about 65%.

3. The method of claim 1, wherein the ammonium hydroxide has a strength of about 25%.

4. The method of claim 1, wherein the ceramic material is obtained as ultra-fine powder.

5. The method of claim 1, wherein the oxides and carbonates are dissolved separately.

* * * * *